(12) United States Patent
Chen

(10) Patent No.: US 12,369,591 B1
(45) Date of Patent: Jul. 29, 2025

(54) BREAD MAKER WITH COLLAPSIBLE CONTAINER

(71) Applicant: Guangzhou Balong Technology Co., Ltd., Guangzhou (CN)

(72) Inventor: Jun Chen, Guangzhou (CN)

( * ) Notice: Subject to any disclaimer, the term of this patent is extended or adjusted under 35 U.S.C. 154(b) by 0 days.

(21) Appl. No.: 19/197,927

(22) Filed: May 2, 2025

(51) Int. Cl.
 *A21B 1/52* (2006.01)
 *A47J 36/06* (2006.01)
 *A47J 37/01* (2006.01)

(52) U.S. Cl.
 CPC ............... *A21B 1/52* (2013.01); *A47J 36/06* (2013.01); *A47J 37/015* (2013.01)

(58) Field of Classification Search
 CPC .... F24C 1/16; F24C 7/10; F24C 7/105; A21B 1/52
 See application file for complete search history.

(56) References Cited

U.S. PATENT DOCUMENTS

| | | | |
|---|---|---|---|
| 3,308,807 A * | 3/1967 | Little | A47J 37/0763 126/275 R |
| 3,428,039 A * | 2/1969 | Becker | F24C 1/16 126/38 |
| 3,682,154 A * | 8/1972 | Mollere | A47J 37/0768 229/117.02 |
| 4,508,094 A * | 4/1985 | Hait | F24C 1/16 126/9 B |
| 4,531,505 A * | 7/1985 | Hait | F24B 1/205 126/25 R |
| 5,535,733 A * | 7/1996 | Hait | F24B 1/202 126/26 |
| 6,546,845 B1 * | 4/2003 | Lanzilli | A47J 37/041 99/449 |
| 2022/0330751 A1 * | 10/2022 | Smith | A47J 37/0763 |

* cited by examiner

*Primary Examiner* — John J Norton
(74) *Attorney, Agent, or Firm* — Tsz Lung Yeung

(57) ABSTRACT

A bread maker includes a base having an accommodating cavity and a heating plate, a heating element, and a collapsible container. The collapsible container includes a body assembly detachably supported on the heating plate. The body assembly includes a plurality of boundary panels, wherein each of the boundary panels foldably connected to two of the adjacent boundary panels so to move between an unfolded position and a folded position, wherein in the unfolded position, the boundary panels are extended to form a substantially rectangular structure on the heating plate, wherein in the folded position, each of the boundary panels is folded with respect to adjacent boundary panels so as to be collapsible into a stacked structure, so that the stacked structure can be accommodated in the accommodating cavity.

12 Claims, 10 Drawing Sheets

BREAD MAKER WITH COLLAPSIBLE CONTAINER

BACKGROUND OF THE PRESENT INVENTION

Field of Invention

The present invention relates to a bread maker, and more particularly to a bread maker comprising a collapsible container which is capable of forming a cooking cavity for making bread, and being able to collapse when the bread maker is not in use.

Description of Related Arts

Countertop-type bread makers have widely been utilized for conveniently making home-made breads. A conventional bread maker, such as a countertop-type bead maker, usually comprises a main body having a receiving cavity, and a heating element mounted in the main body. A user needs to put pre-mixed ingredients into the receiving cavity and allow those ingredients to heat for a predetermined period of time for making home-made bread products. Users can select various programs for baking different types of breads.

A major disadvantage of the home-use bread maker such as the one described above is that the bread maker is usually bulky in size and it may take up a lot of space on a kitchen's countertop. However, a user may not need to use the bread maker on a daily basis. Thus, when the bread maker is not in use, the user may choose to store it somewhere else. Due to the bulky size of the bread maker, it may be hard for the user to find a place to store it.

As a result, there is a need to provide a bread maker which is easy to set up when in use, and which can be conveniently stored when not in use.

SUMMARY OF THE PRESENT INVENTION

Certain variations of the present invention provide a bread maker comprising a collapsible container which is capable of forming a cooking cavity for making bread, and is capable of being folded and collapsed into a compact structure when the bread maker is not in use.

Certain variations of the present invention provide a bread maker comprising a collapsible container which comprises a plurality of boundary panels which may be detached from a base, folded to form a compact structure, and accommodated in the base for ease of storage.

In one aspect of the present invention, it provides a bread maker, comprising:

a base having an accommodating cavity and a heating plate in the accommodating cavity;

a heating element mounted in the base; and a collapsible container, which comprises:

a body assembly detachably supported on the heating plate, the body assembly comprising a plurality of boundary panels, each of the boundary panels foldably connected to two of the adjacent boundary panels so as to move between an unfolded position and a folded position, wherein in the unfolded position, the boundary panels are extended to form a substantially rectangular structure on the heating plate and having a receiving opening between the boundary panels, wherein in the folded position, each of the boundary panels is folded with respect to adjacent boundary panels so as to be collapsible into a stacked structure, the stacked structure being accommodated in the accommodating cavity; and a container cover selectively and detachably connected to one of the body assembly and the base.

This summary presented above is provided merely to introduce certain concepts and not to identify any key or essential features of the claimed subject matter.

DETAILED DESCRIPTIONS OF THE PRESENT INVENTION

Figure 1:
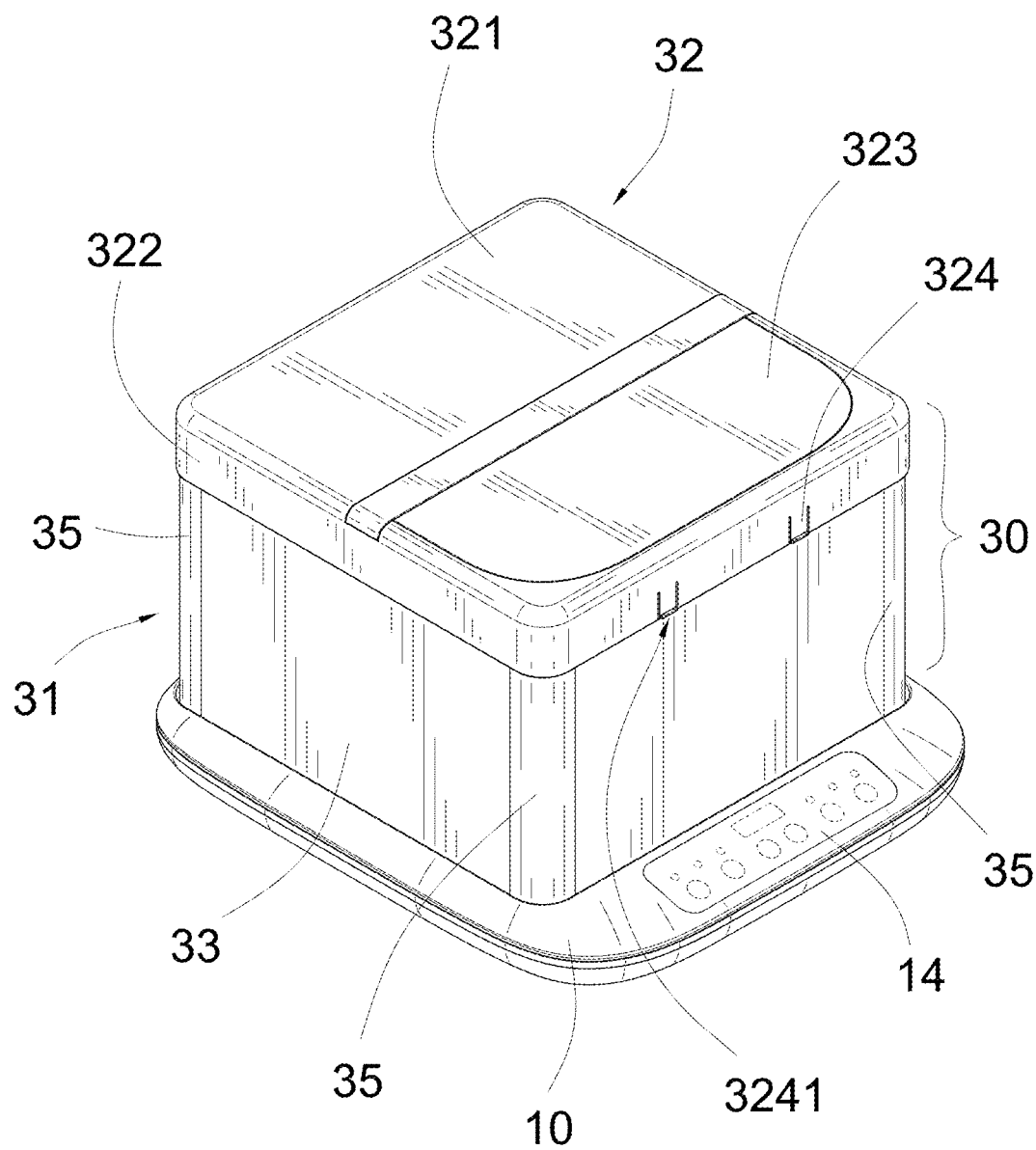
FIG. 1 is a perspective view of a bread maker according to a preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms " ", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 2, FIG. 3A to FIG. 3D, FIG. 4, FIG. 5A to FIG. 5B and FIG. 6 of the drawings, a bread maker according to a preferred embodiment of the present invention is illustrated. The bread maker may be utilized for making bakery products in domestic environments (i.e., home use). The purpose of the bread maker is to allow a user to prepare his own ingredients and bake home-made bakery products, such as bread. Broadly, the bread maker may comprise a base 10, a heating element 20, and a collapsible container 30.

The base 10 may have an accommodating cavity 11 and comprise a heating plate 12 provided in the accommodating cavity 11. The heating element 20 may be provided in the base 10 and in thermal communication with the heating plate 12, so that the heating element 20 may be arranged to increase the temperature of the heating plate 12 for baking purposes.

The collapsible container 30 may comprise a body assembly 31 and a container cover 32. The body assembly 31 may be detachably supported on the heating plate 12, and may comprise a plurality of boundary panels 33, wherein each of the boundary panels 33 may be foldably connected to two of the adjacent boundary panels 33 so as to move between an unfolded position and a folded position, wherein in the unfolded position, the boundary panels 33 may be extended to form a substantially rectangular structure and be supported on the heating plate 12 to form a cooking cavity 34 between the boundary panels 33, wherein in the folded position, each of the boundary panels 33 may be folded with respect to adjacent boundary panels 33 so as to be collapsible into a stacked structure. The stacked structure may be accommodated in the accommodating cavity 11.

The container cover 32 may be selectively and detachably connected to one of the body assembly 31 and the base 10.

According to the preferred embodiment of the present invention, the base 10 may form a main supporting structure for the entire bread maker, in which the accommodating cavity 11 may be indently formed from the top of the base 10. The base 10 may further comprise a heating plate 12 mounted in the accommodating cavity 11 so as to form a heating platform on which the collapsible container 30 may be placed. The heating plate 12 may be connected to the heating element 20 so that the heating element 20 may be arranged to increase the temperature of the heating plate 12 for baking the ingredients disposed in the cooking cavity 34. Moreover, the base 10 may further comprise a control panel 14 for controlling cooking operations and for indicating a cooking status of the bread maker. Note that the entire cooking process may be digitally controlled by a microprocessor 40 which may be provided in the base 10 and may be electrically connected to the control panel 14 and the heating element 20.

The heating element 20 may be configured as a conventional heating core, such as heating coil or other alternatives. The heating element 20 may be in thermal communication with the heating plate 12 which serves to cook the ingredients in the cooking cavity 34.

Figure 2:
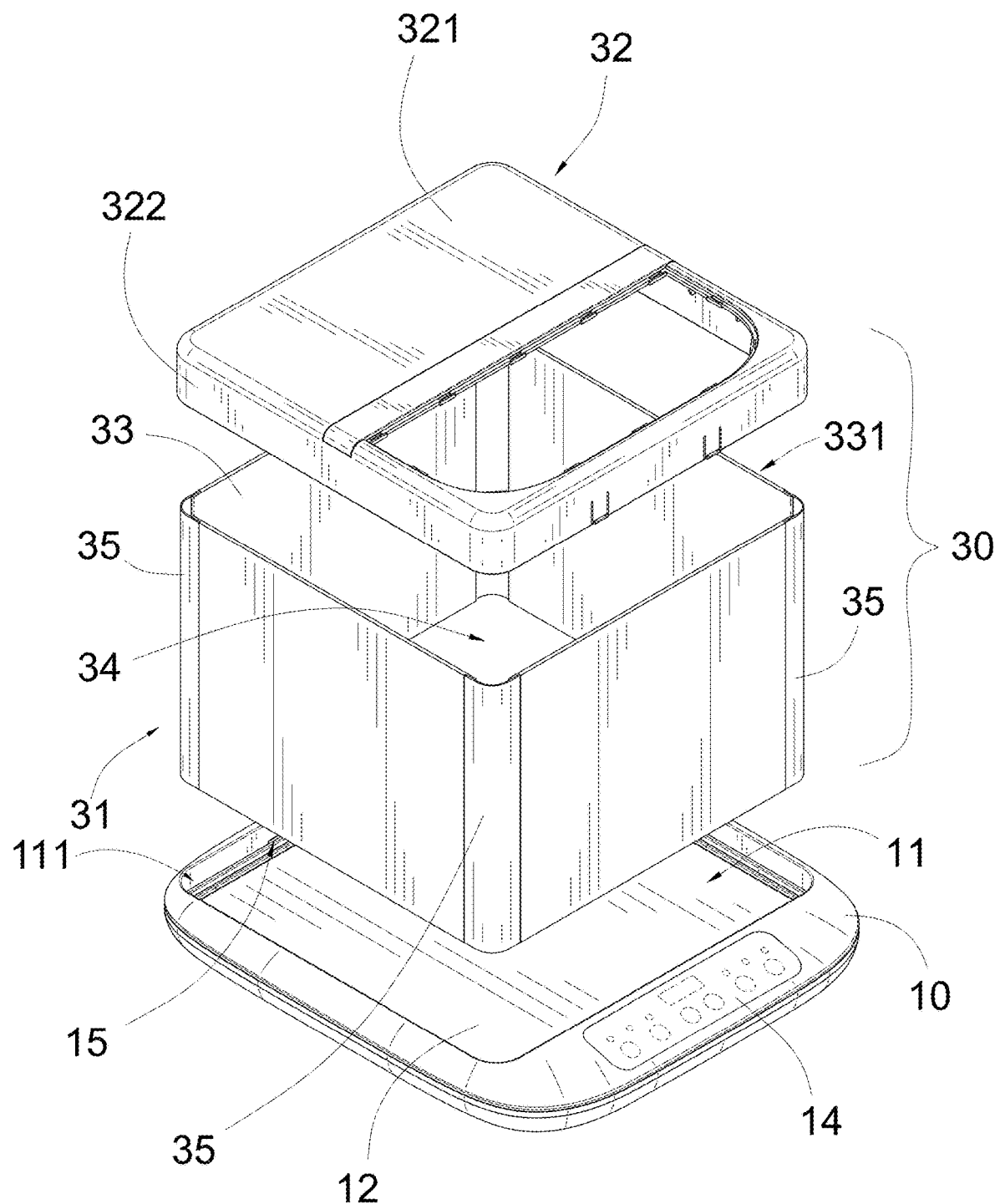
FIG. 2 is an exploded perspective view of the bread maker according to the preferred embodiment of the present invention.
Figure 5A:
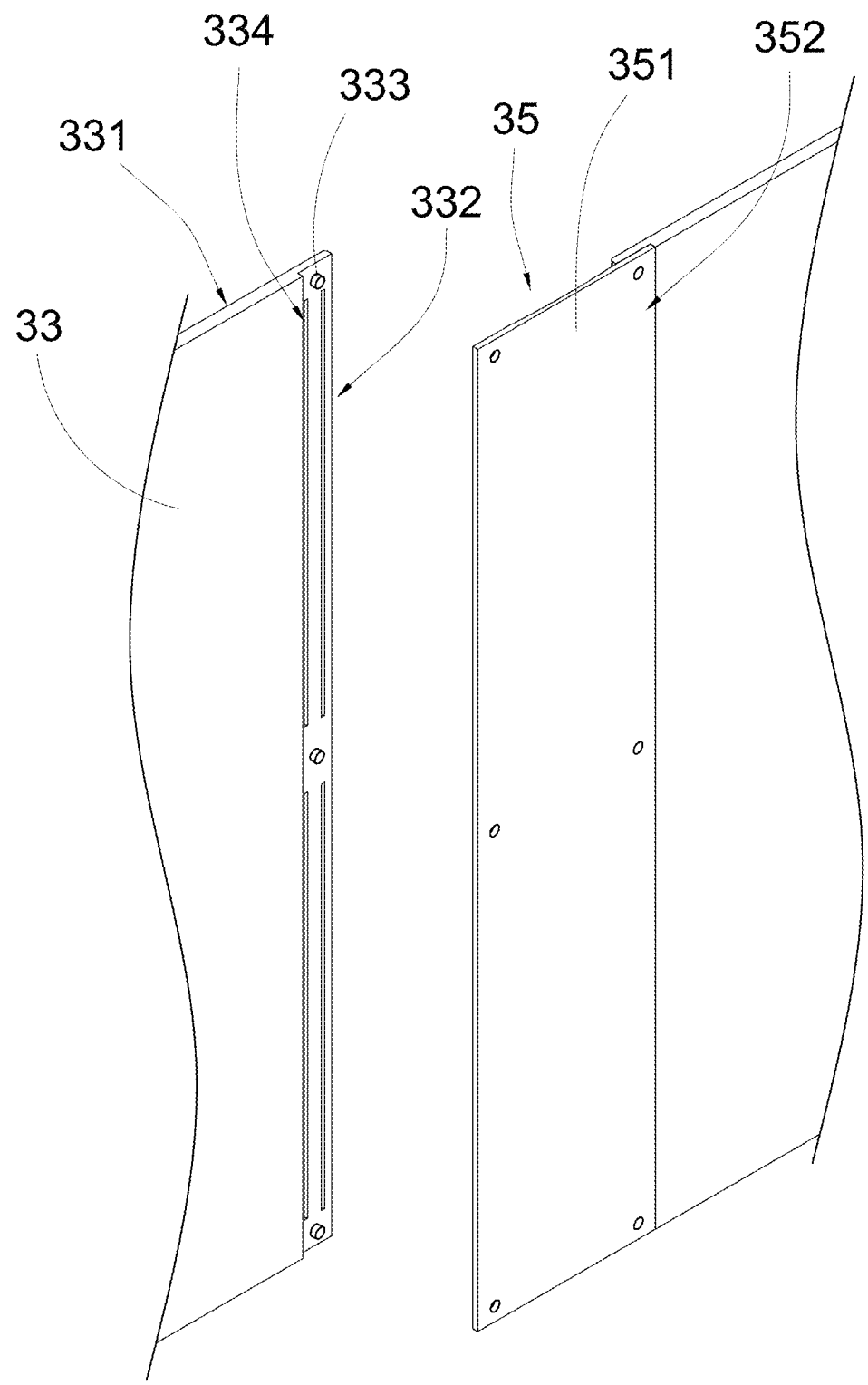
FIG. 5A and FIG. 5B are schematic diagrams of the bread maker according to the preferred embodiment of the present invention, illustrating detailed structure of a folding ridge, and its engagement with the boundary panel.
Figure 5B:
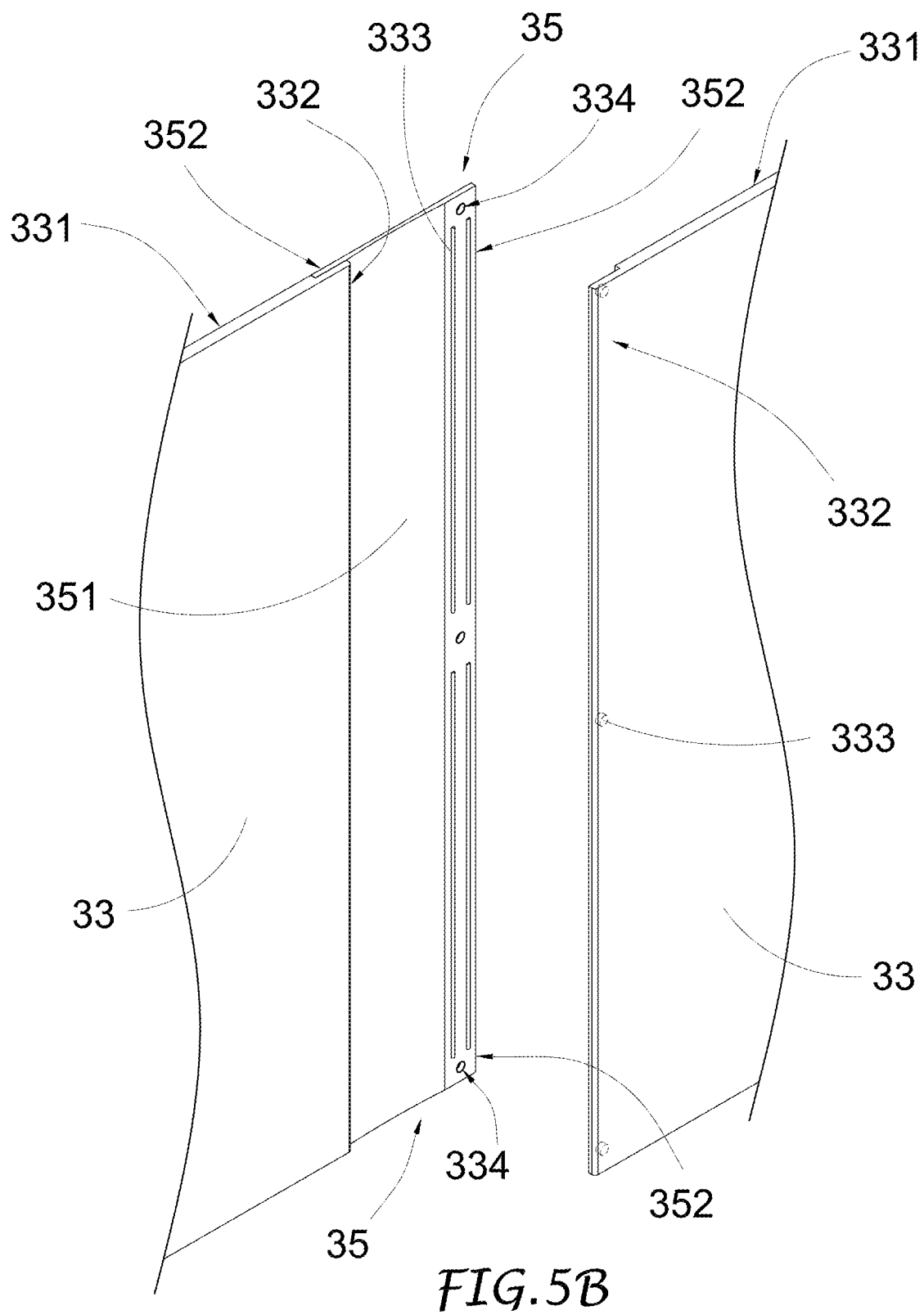
Figure 6:
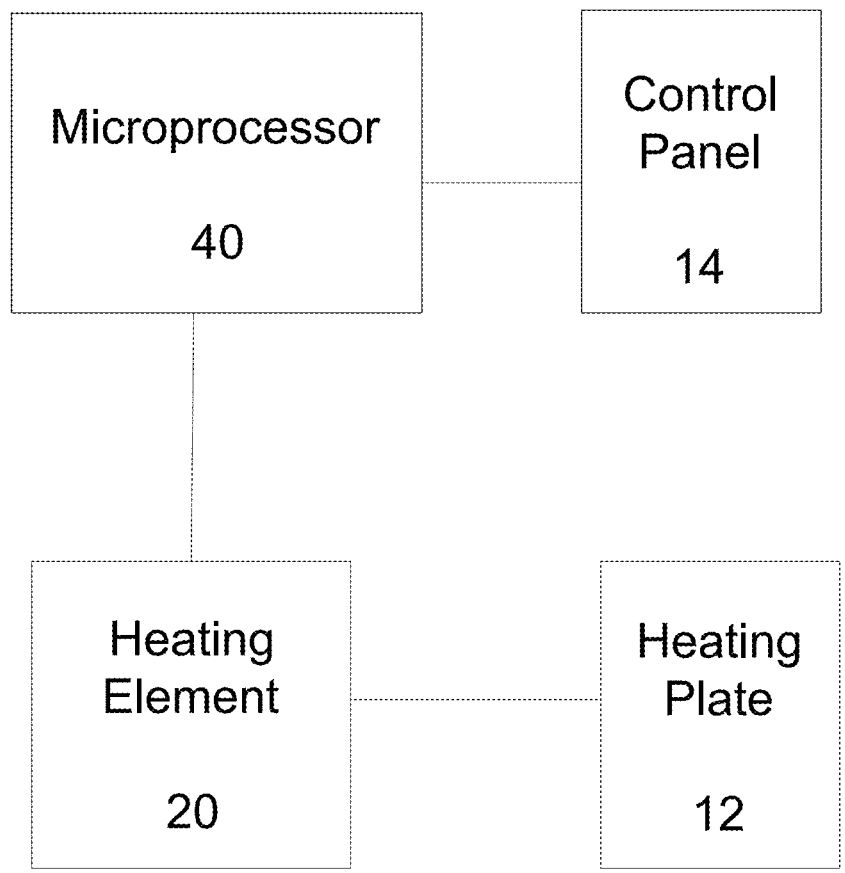
FIG. 6 is a block diagram illustrating the electronic components of the bread maker according to the preferred embodiment of the present invention.

The body assembly 31 of the collapsible container 30 may comprise a plurality of the boundary panels 33 securely erecting on top of the heating plate 12 when the boundary panels 33 are in the unfolded position. As shown in FIG. 2 and FIG. 5A to FIG. 5B of the drawings, each of the boundary panels 33 may be configured to have two horizontal side edge portions 331 and two vertical side edge portions 332 to form a generally rectangular cross section. Each of the boundary panels 33 may be arranged to be pivotally foldable with respect to the adjacent boundary panels 33. Thus, the body assembly 31 may further comprise a plurality of folding ridges 35 each coupling between two adjacent boundary panels 33 for facilitating pivotal folding of those two corresponding boundary panels 33.

More specifically, each of the folding ridges 35 may be elongated in shape and may be configured from elastic and deformable material, such as silicon rubber. Each of the folding ridges 35 may comprise an elongated ridge body 351 having two connecting portions 352 connecting to the vertical side edge portions 332 of two adjacent boundary panels 33 respectively. Since the folding ridges 35 may be made of elastic and deformable material, the two corresponding adjacent boundary panels 33 may be pivotally folded toward each other through the connecting folding ridge 35.

Referring to FIG. 5A and FIG. 5B of the drawings, each of the folding ridges 35 may be attached on a corresponding vertical side edge portion 332 of a corresponding boundary panel 33. The attachment may be accomplished through engagement mechanisms. Thus, each of the boundary panels 33 may have at least one of an engagement protrusion 333 and an attachment slot 334 while each of the folding ridges 35 may have at least one of the engagement protrusion 333 and the attachment slot 334 which may be corresponding to that/those of the corresponding boundary panel 33, wherein an engagement protrusion 333 may be arranged to engage with a corresponding attachment slot 334.

Note that each of the engagement protrusions 333 and the attachment slots 334 may take a wide variety of shapes. For example, an engagement protrusion 333 may be configured to form a cylindrical protrusion, while a corresponding attachment slot 33 may take the form of a hole. In another alternative, an engagement protrusion 333 may form an elongated protruding ridge, while a corresponding attachment slot 33 may be in the form of an elongated slot. The goal is to allow fit engagement between the boundary panel 33 and the folding ridge 35.

In this preferred embodiment of the present invention, the collapsible container 30 may comprise four boundary panels 33 and four folding ridges 35. When the boundary panels 33 are in the unfolded position, they may be erected and mounted on the heating plate 12 and form the rectangular structure so that the cooking cavity 34 may be formed as the space surrounded by the boundary panel 33. At the same time, the container cover 32 may be detachably mounted on the horizontal side edge portions 331 of the boundary panels 33 for selectively covering the cooking cavity 34, as shown in FIG. 1 and FIG. 2 of the drawings.

Figure 3A:
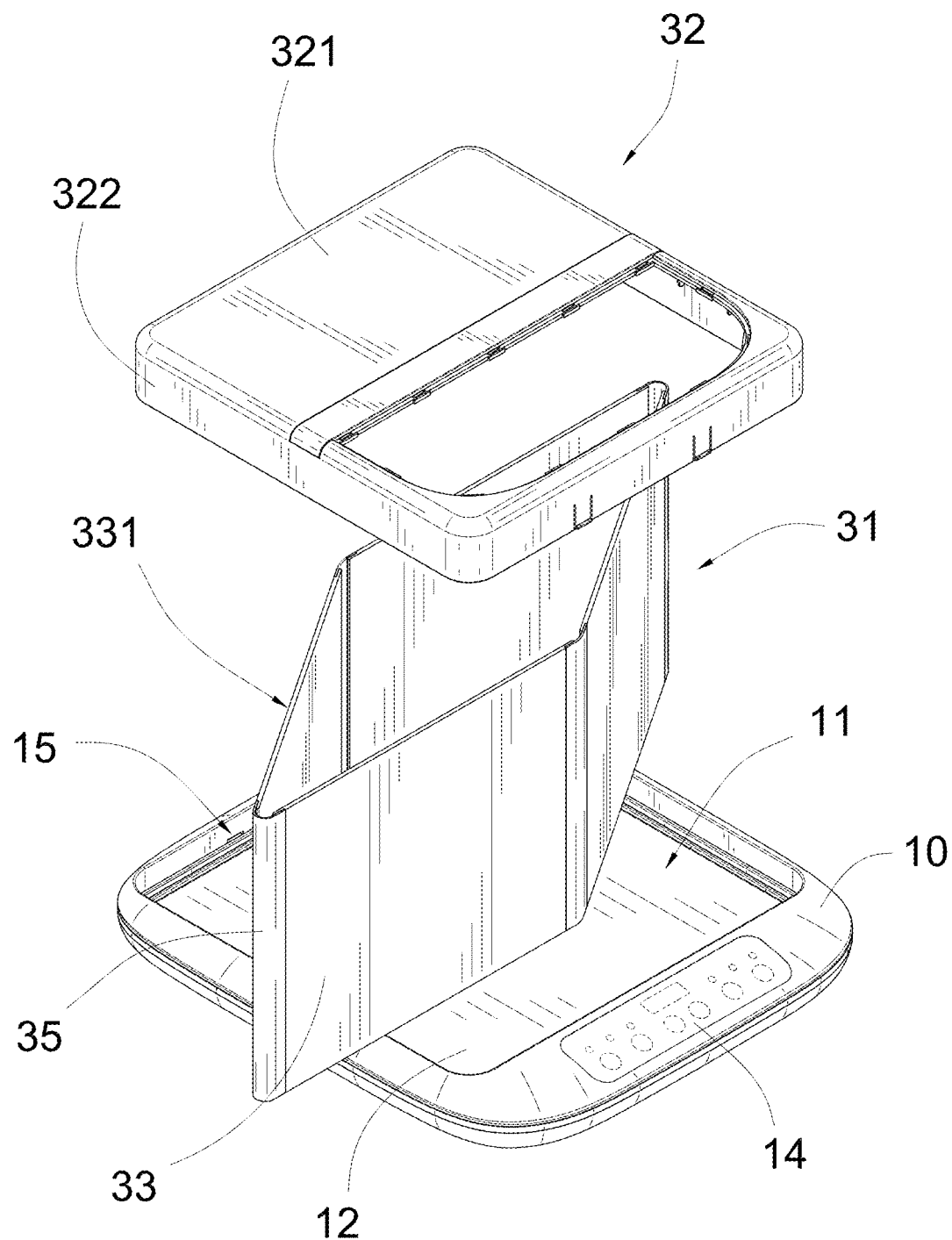
FIG. 3A to FIG. 3D are schematic diagram of a bread maker according to the preferred embodiment of the present invention, illustrating that several boundary panels may be detached from a base and overlappedly folded into a compact size.

When the bread maker is not in use, a user may detach the container cover 32 from the boundary panels 33 and in turn detach the four boundary panels 33 from the heating plate 12. In order to fold the four boundary panels 33 into a compact stacked structure (i.e. from the unfolded position to the folded position), the user needs first to fold two of the folding ridges 35 which are positioned in diagonal with each other (i.e. opposite folding ridges 35). As shown in FIG. 3A of the drawings, the four boundary panels 33 may be folded such that two of the boundary panels 33 are overlapped with another two of the boundary panels 33 respectively.

Figure 3B:
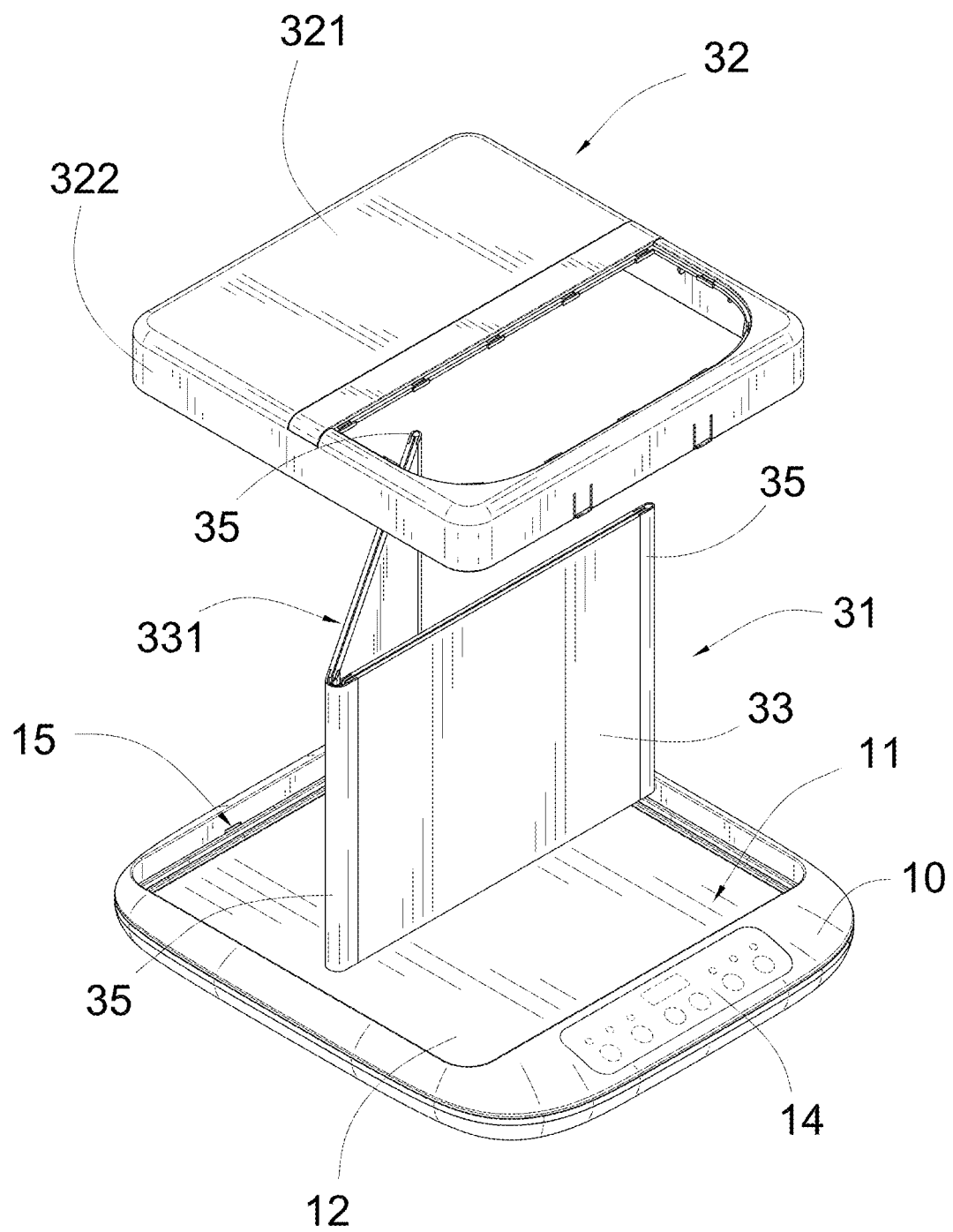
Figure 3C:
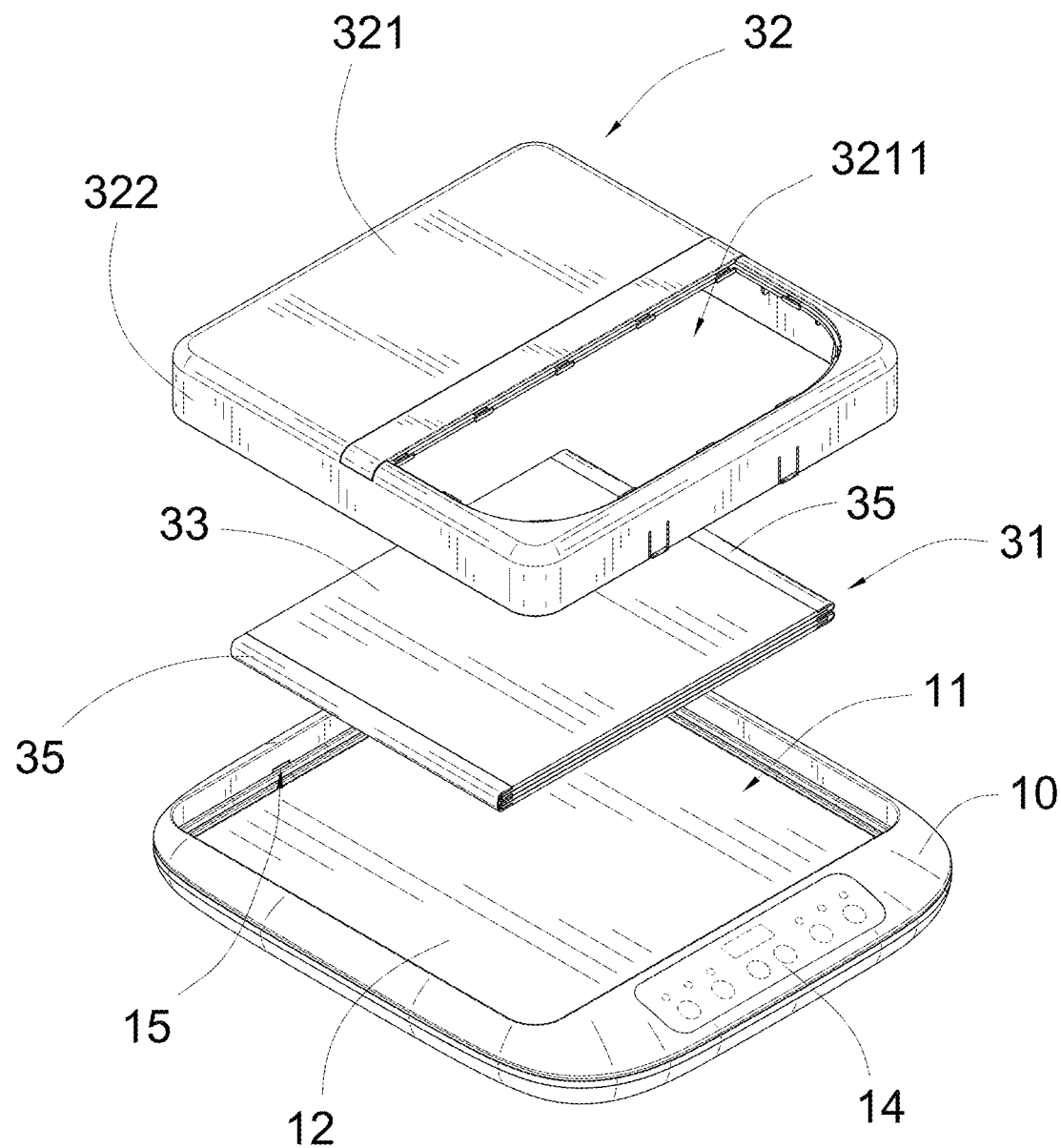

After that, a user may fold two of the boundary panels 33 toward the other two boundary panels 33 so as to form a stack of four boundary panels 33, as shown in FIG. 3B and FIG. 3C of the drawings. The four boundary panels 33 may thus be overlappedly folded into a compact size, and may laid flat on the heating plate 12. It is worth mentioning that a cross-sectional shape and the size of each of the boundary panels 33 may be identical, and correspond to that of the accommodating cavity 11. Moreover, a total thickness of the stack of the four boundary panels 33 may be less than a depth of the accommodating cavity 11 so that the stack of the boundary panels 33 may be fittedly accommodated in the accommodating cavity 11 when the bread machine is not in use.

The container cover 32 may comprise a top cover panel 321 having a top opening 3211 and at least one extension panel 322 extending from the top cover panel 321. The top cover panel 321 may be shaped and sized to correspond to the cooking cavity 34 so that it may be arranged to detachably mount on top of the body assembly 31 so as to selectively cover the cooking cavity 34 when the bread maker is in use (see FIG. 1 of the drawings). In this preferred embodiment of the present invention, the container cover 32 may comprise four extension panels 322 downwardly extending from four peripheral side edges of the top cover panel 321 which may be configured to have a substantially rectangular shape.

The container cover 32 may further comprise a sliding panel 323 moveably mounted on the top cover panel 321 to selectively close the top opening 3211. Thus, the sliding panel 323 may be slid to completely cover the top opening 3211 so as to completely cover the cooking cavity 34. Alternatively, the sliding panel 323 may be slid to expose the top opening 3211 to an exterior of the body assembly 31.

Figure 3D:
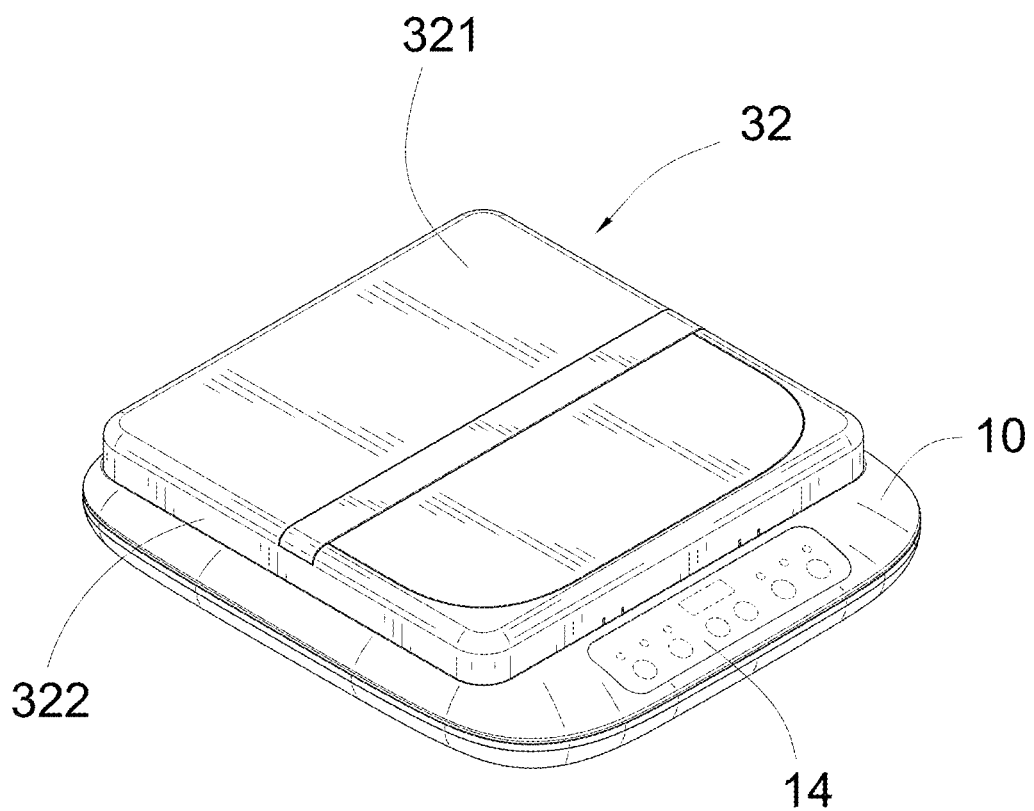
Figure 4:
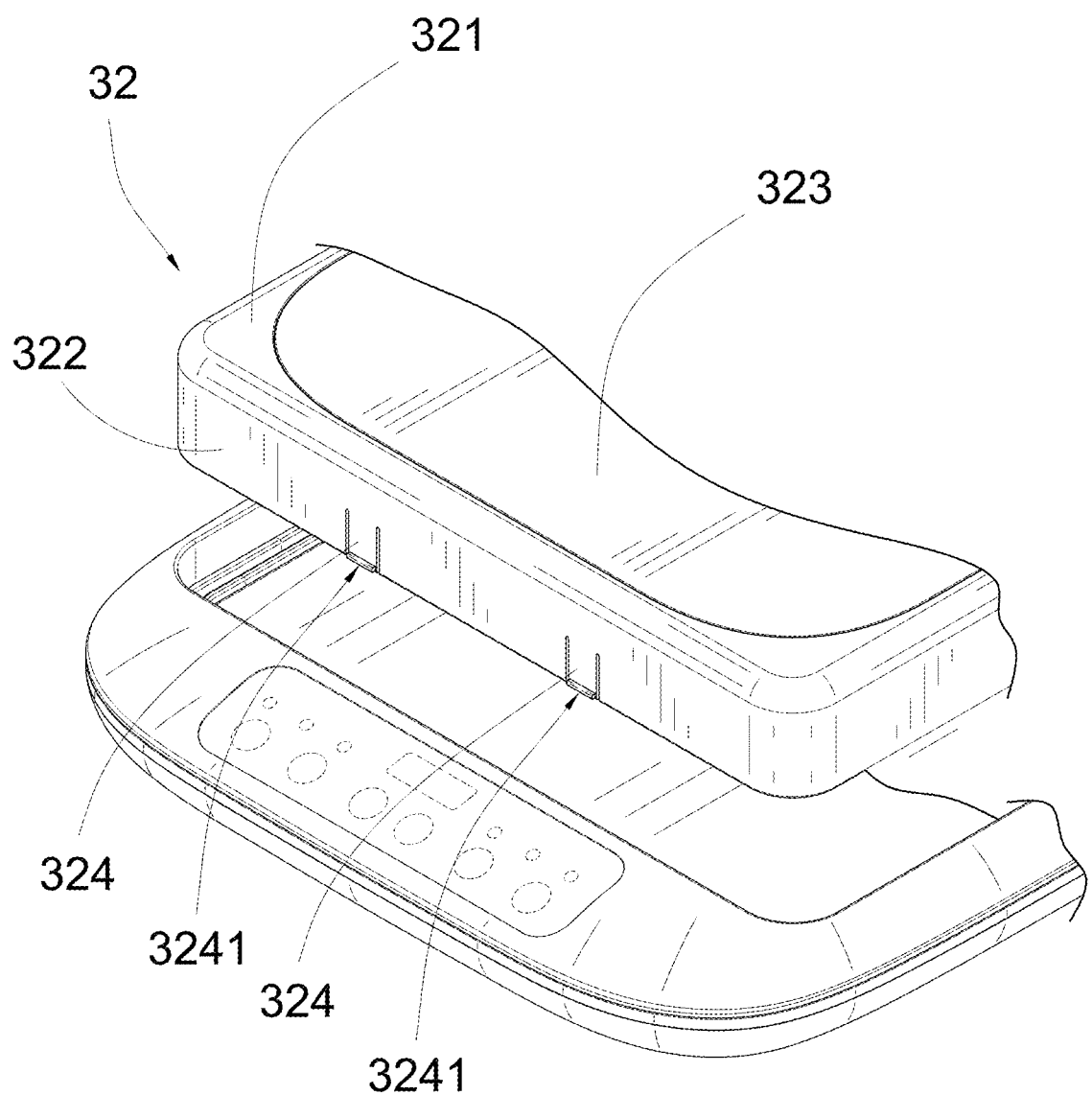
FIG. 4 is a schematic diagram of a container cover of the bread maker according to the preferred embodiment of the present invention.

Moreover, the container cover 32 may further comprise a plurality of engaging clips 324 formed on the extension panels 322, wherein each of the engaging clips 324 may have a locking ridge 3241 for engaging with the base 10. Each of the engaging clips 324 may be configured to be deformable and have a predetermined elasticity for pushing the locking ridge 3241. Thus, the base 10 may further have a plurality of engaging slots 15 formed on at least one sidewall 111 of the accommodating cavity 11, wherein the locking ridges 3241 of the engaging clips 324 may be detachably engaged with the engaging slots 15 respectively so as to detachably connect the container cover 32 with the base 10. When the container cover 32 is detachably engaged to the base 10, the boundary panels 33 may be accommodated in the accommodating cavity 11 and securely protected by the container cover 32, as shown in FIG. 3D of the drawings. Due the inherent elasticity of the engaging clips 324, the locking ridges 3241 of the engaging clips 324 may be pushed by the inherent elasticity to engage with the engaging slots 15 respectively until a user exerts a pushing force to disengage the locking ridges 3241 of the engaging clips 324 from the engaging slots 15 and detach the container cover 32 from the base 10.

From the forgoing descriptions, one skilled in the art may appreciate that the bread maker of the present invention may allow users to bake home-made bakery products such as bread at home, while allowing them to conveniently store the bread maker when it is not in use. The bread maker may be collapsed into a very compact size for ease of storage and transportation.

The present invention, while illustrated and described in terms of a preferred embodiment and several alternatives, is not limited to the particular description contained in this specification. Additional alternative or equivalent components could also be used to practice the present invention.

What is claimed is:

1. A bread maker, comprising:
   a base having an accommodating cavity and a heating plate in the accommodating cavity;
   a heating element mounted in the base and being in thermal communication with the heating plate; and
   a collapsible container, which comprises:
   a body assembly detachably supported on the heating plate, the body assembly comprising a plurality of boundary panels, each of the boundary panels foldably connected to two of the adjacent boundary panels so as to move between an unfolded position and a folded position, wherein in the unfolded position, the boundary panels are extended to form a substantially rectangular structure on the heating plate and having a receiving opening between the boundary panels, wherein in the folded position, each of the boundary panels is folded with respect to adjacent boundary panels so as to be collapsible into a stacked structure, the stacked structure being accommodated in the accommodating cavity; and
   a container cover selectively and detachably connected to one of the body assembly and the base.

2. The bread maker, as recited in claim 1, wherein each of the boundary panels is configured to have two horizontal side edge portions and two vertical side edge portions to form a substantially rectangular cross-sectional shape, the body assembly further comprising a plurality of folding ridges each coupling between two corresponding vertical side edge portions of the two adjacent boundary panels respectively for facilitating pivotal folding of the two corresponding boundary panels.

3. The bread maker, as recited in claim 2, wherein each of the folding ridges is elongated in shape and is configured from elastic and deformable material.

4. The bread maker, as recited in claim 3, wherein each of the folding ridges comprises an elongated ridge body having two connecting portions connecting to the vertical side edge portions of two adjacent boundary panels respectively so that the two corresponding adjacent boundary panels are capable of pivotally folding toward each other through the connecting folding ridge.

5. The bread maker, as recited in claim 4, wherein each of the boundary panels has at least one engagement protrusion and an attachment slot while each of the folding ridges has at least one of the engagement protrusion and the attachment slot which is corresponding to that of the corresponding boundary panel, wherein an engagement protrusion is arranged to engage with a corresponding attachment slot.

6. The bread maker, as recited in claim 5, wherein the body assembly comprises altogether four of the boundary panels and four of the folding ridges, each of the folding ridges foldably connecting each two adjacent boundary panels, wherein the boundary panels are moved from the unfolded position to the folded position by first folding two opposite folding ridges such that two of the boundary panels are overlapped with another two of the boundary panels respectively, and then by folding remaining two folding ridges so as to fold two of the boundary panels toward the other two of the boundary panels for forming a stack of four boundary panels, the stack of four boundary panels being sized and shaped to be accommodated in the accommodating cavity.

7. The bread maker, as recited in claim 6, wherein the container cover comprises a top cover panel having a top opening, and at least one extension panel extending from the top cover panel, the top cover panel being shaped and sized to correspond to the cooking cavity so as to be detachably mounted on top of the body assembly to selectively cover the cooking cavity when the bread maker is in use.

8. The bread maker, as recited in claim 7, wherein the container cover further comprises a sliding panel moveably mounted on the top cover panel to selectively close the top opening.

9. The bread maker, as recited in claim 8, wherein the container cover further comprises at least one engaging clip having a locking ridge formed on the extension panel, the engaging clip being configured to be deformable and having a predetermined elasticity for pushing the locking ridge, the base further having at least one engaging slot formed on a sidewall of the accommodating cavity, wherein the locking ridge of the engaging clip is arranged to detachably engage with the engaging slot so as to detachably connect the container cover to the base.

10. The bread maker, as recited in claim 1, wherein the container cover comprises a top cover panel having a top opening, and at least one extension panel extending from the top cover panel, the top cover panel being shaped and sized to correspond to the cooking cavity so as to be detachably mounted on top of the body assembly to selectively cover the cooking cavity when the bread maker is in use.

11. The bread maker, as recited in claim 10, wherein the container cover further comprises a sliding panel moveably mounted on the top cover panel to selectively close the top opening.

12. The bread maker, as recited in claim 11, wherein the container cover further comprises at least one engaging clip having a locking ridge formed on the extension panel, the engaging clip being configured to be deformable and having a predetermined elasticity for pushing the locking ridge, the base further having at least one engaging slot formed on a sidewall of the accommodating cavity, wherein the locking ridge of the engaging clip is arranged to detachably engage with the engaging slot so as to detachably connect the container cover to the base.

* * * * *